UNITED STATES PATENT OFFICE.

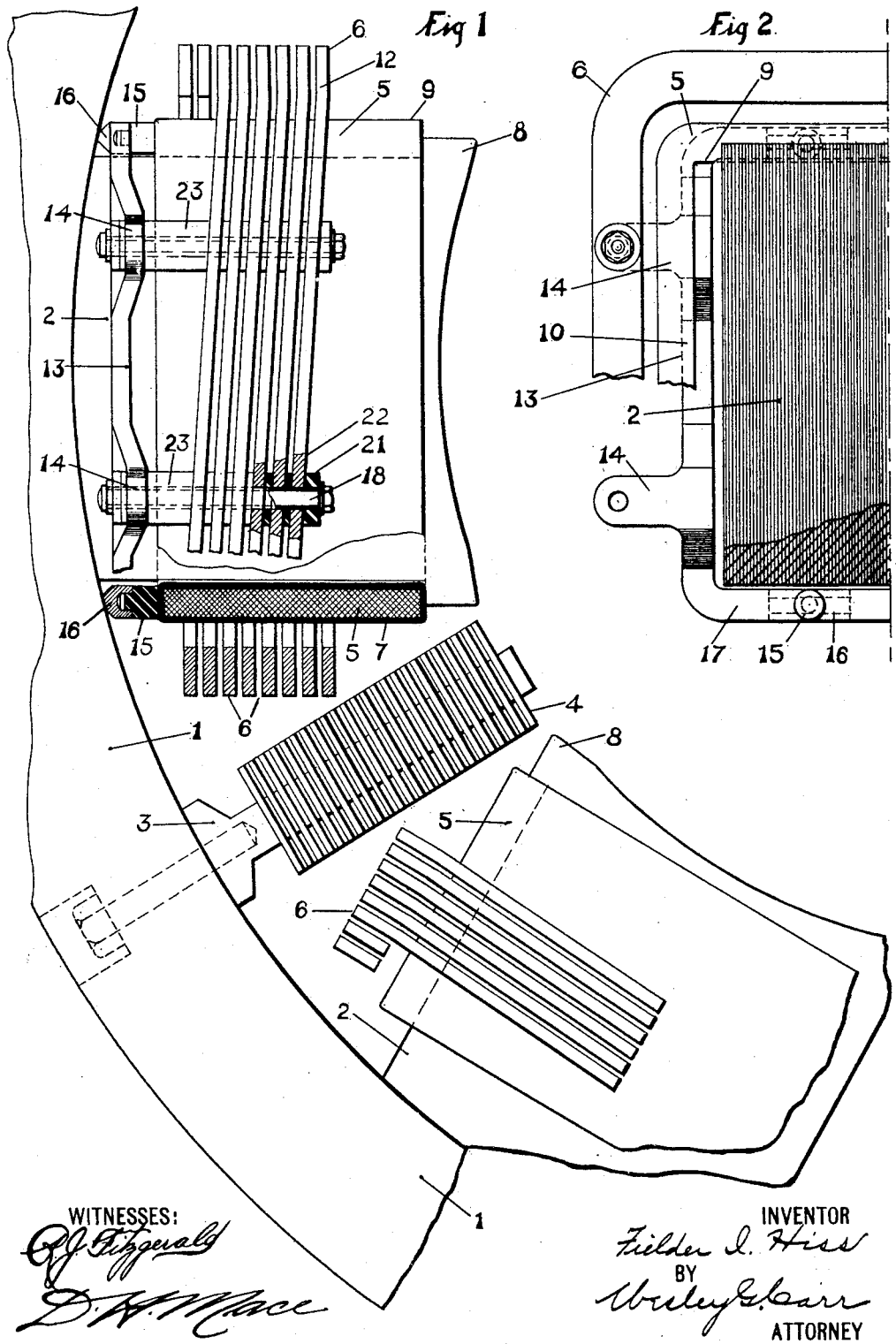

FIELDER I. HISS, OF NEWARK, NEW JERSEY, ASSIGNOR TO WESTINGHOUSE ELECTRIC AND MANUFACTURING COMPANY, A CORPORATION OF PENNSYLVANIA.

DYNAMO-ELECTRIC MACHINE.

1,162,483. Specification of Letters Patent. Patented Nov. 30, 1915.

Original application filed December 21, 1910, Serial No. 598,519. Divided and this application filed October 2, 1914. Serial No. 864,565.

*To all whom it may concern:*

Be it known that I, FIELDER I. HISS, a citizen of the United States, and a resident of Newark, in the county of Essex and State of New Jersey, have invented a new and useful Improvement in Dynamo-Electric Machines, of which the following is a specification, this application being a division of application, Serial No. 598,519, filed December 21, 1910.

My invention relates to dynamo-electric machines, and it has special reference to the field coil structures of such machines.

The object of my invention is to provide a well ventilated structure of the above-indicated class which shall be simple and durable in construction and shall be constructed in such manner that particularly free and effective radiation is obtained, whereby a material increase of economy in both copper and insulating material is effected.

Another object of my invention is to utilize the available space between adjacent polar projections of a field magnet structure to the best advantage, whereby the previously unused space is made to serve a useful purpose, which permits a decrease in the diameter of the field magnet yoke and, consequently, of the machine as a whole.

When dynamo-electric machines are provided with the customary radially projecting pole pieces and field magnet coils of uniform thickness, it is manifest that, although the pole tips and the inner ends of adjacent magnet coils may be in close proximity, a considerable space exists between the base portions of the pole pieces, near the yoke, which is not utilized. It has been common in the prior art to provide field magnet coils of a tapered form which are comparatively thin near the pole tips and increase gradually in thickness toward their bases. This type of coil, of course, tends to make use of the otherwise unused space, but, on account of its peculiar shape, it requires special coil forms and is expensive and impracticable to employ commercially. In compound-wound dynamo-electric machines in which both shunt and series coils are placed on each polar projection, it is usual to dispose the coils one above the other, which necessitates comparatively short and thick coils having the undesirable feature of poor heat radiation. Furthermore, the available space near the field magnet yoke is not economically utilized and the size of the machine is unnecessarily large.

My invention has particular reference to compound-wound field coil structures and is intended to utilize the available space without the use of specially wound coils or the inferior heat-radiating features of the usual short and thick coils. I accomplish this result by providing a relatively long and thin shunt coil of standard form which extends approximately the length of the polar projection, and I surround the outer end of the shunt coil with a standard-wound series coil which is of considerable less winding length than the shunt coil and is disposed at the base of the polar projection near the yoke. The series coil is liberally spaced from the shunt coil for ventilating purposes and is effectively secured in position in a novel manner, to be hereinafter set forth.

Although the field coil structure hereinbefore mentioned is applicable to any class of compound-wound dynamo-electric machines, it is particularly adapted to machines having intermediate commutating poles, since, in this case, strict economy of space is essential and the heating conditions are severe by reason of the proximity of the commutating and main field coils.

In my copending application, Serial No. 598,519 filed December 21, 1910, of which this application is a division, I have disclosed a structure of a similar nature, which is particularly adapted for use with certain types of machines and under certain operating conditions.

In the accompanying drawings, Figure 1 is a view, partially in vertical section and partially in end elevation, of a portion of the stationary field magnet structure of a dynamo-electric machine which embodies my invention. Fig. 2 is a bottom plan view of portions of certain of the field coils shown in Fig. 1, the polar projection being shown in section along the line II—II of Fig. 1.

Referring particularly to the drawing the structure here shown comprises a field magnet yoke or frame 1 having main polar projections 2, intermediate polar projections 3, auxiliary coils 4, shunt coils 5 and series coils 6.

The field magnet yoke 1 and the polar projections 2 and 3 are of well-known construction, said polar projections being detachably secured to the field magnet yoke in the usual manner.

The shunt coils 5 are of like construction and each comprises a plurality of convolutions of wire conductor which are wound in accordance with usual practice and are bound together by a sheath 7 of tape or other insulating material. The axial length of the shunt coil 5 is relatively great in comparison to its thickness, whereby a coil is produced which embodies the desired free heat-radiating features. Each of the shunt coils 5 is disposed around a main polar projection 2 and rests upon pole tips 8 in the usual manner. The side portions 9 of said shunt coils fit closely against the corresponding sides of the main polar projections 2, while the side portions 10 extend materially beyond the corresponding sides of the polar projections 2.

The series coils 6 are of like construction and each comprises a plurality of turns or convolutions of strap conductor 12. The series coils 6 are of materially less axial length than the shunt coils 5, and are disposed around the ends of the shunt coils adjacent to the field magnet yoke 1. Furthermore, the series coils 6 are liberally spaced from the shunt coils 5 and are secured to and maintained in position by means of grids or supporting frames 13, having side projecting lugs 14. A plurality of insulating buttons or studs 15 are adapted to rest upon the outer ends of the shunt coils 5 and to insulate the grids 13 therefrom. Furthermore, a plurality of projecting portions 16 are provided on the end members 17 of the grids 13 for the purpose of engaging the inner surface of the field magnet yoke 1 whereby the grids 13 and shunt coils 5 are maintained securely in position. Each of the series coils 6 is securely fastened to the lugs 14 of the grid 13 by means of insulated clamping bolts 18 which project through suitable openings in the several convolutions of the strap conductor 12. Suitable insulating blocks 21, 22 and 23 are provided to properly space the convolutions of the series coil 6 and to maintain said series coil in the desired position, as will be readily understood.

While I have shown and described a field coil structure of particular form and of specific structural details, those skilled in the art will readily understand that various modifications may be effected therein without exceeding the spirit and scope of my invention, and I desire that only such limitations shall be imposed as are indicated in the appended claims.

I claim as my invention:

1. A field magnet structure for dynamo-electric machines comprising a shunt coil, a supporting frame resting upon one end of said coil, a series coil surrounding a portion of said shunt coil, and means for rigidly securing said series coil to said frame.

2. A field magnet structure for dynamo-electric machines comprising a long and thin shunt coil, a supporting frame resting on the outer end of said coil, and a shorter series coil surrounding the outer portions of said shunt coil and secured to said supporting frame.

3. In a dynamo-electric machine, the combination with a field magnet frame having radial polar projections, a shunt coil disposed around each polar projection and supported thereby, a supporting frame engaging said field magnet frame and the outer end of said shunt coil, and a series coil surrounding said shunt coil adjacent to said magnet frame, of means for attaching said shunt coil to said supporting frame.

4. In a dynamo-electric machine, the combination with a field magnet frame having radial polar projections, a shunt coil surrounding each projection and supported thereby, and a series coil in concentric relation to said shunt coil, of a supporting frame surrounding said polar projection, insulating members interposed between said frame and said shunt coil, and insulated clamping members for securing said series coil to said supporting frame.

5. A field magnet structure for dynamo-electric machines comprising a shunt coil, a concentrically disposed series coil, a supporting frame resting upon one end of said shunt coil and projecting laterally beyond it, and a plurality of insulated bolts projecting through said series coil and said supporting frame for maintaining said series coil in position.

6. A field magnet structure for dynamo-electric machines comprising a shunt coil, a series coil disposed around said shunt coil and comprising a plurality turns of strap conductor spaced apart by insulating means, a supporting frame coöperating with the outer end of said shunt coil and having portions projecting laterally beyond said coil, insulated members projecting through openings in the convolutions of said strap conductor, and insulating spacing means for clamping said series coil to the projecting portions of said supporting frame.

7. A field magnet structure for dynamo-electric machines comprising a long shunt coil, a short series coil disposed around one end of said shunt coil, and comprising a plurality of turns of strap conductor spaced apart by insulating members, a supporting frame adapted to rest against the outer end of said shunt coil and having laterally projecting lugs and a plurality of insulated bolts for clamping said series coil to said lugs, said series coil being spaced away from said shunt coil.

8. In a dynamo-electric machine, the combination with a field magnet frame having radial polar projections, a shunt coil surrounding each of said projections and supported thereby, a supporting frame surrounding said projection between said field magnet frame and said shunt coil and having laterally projecting side supporting lugs and outwardly projecting end portions adapted to engage the field magnet frame, insulating members disposed between the end portions of said supporting frame and said shunt coil, a series coil of spaced convolutions surrounding said shunt coil, and insulated bolts for clamping said coil to said side lugs of said supporting frame.

In testimony whereof, I have hereunto subscribed my name this 21st day of Sept. 1914.

FIELDER I. HISS.

Witnesses:
CHARLES L. PILGER, Jr.,
MABEL REUTHER.

Copies of this patent may be obtained for five cents each, by addressing the "Commissioner of Patents, Washington, D. C."